US006690403B1

(12) United States Patent
Tuli

(10) Patent No.: US 6,690,403 B1
(45) Date of Patent: Feb. 10, 2004

(54) PORTABLE HIGH SPEED INTERNET DEVICE AND INFORMATION ON LINKS TO WEB SITES

(76) Inventor: Raja Tuli, 1155 Rene Levesque West #3500, Montreal QC (CA), H3B 3T6

( * ) Notice: Subject to any disclaimer, the term of this patent is extended or adjusted under 35 U.S.C. 154(b) by 0 days.

(21) Appl. No.: 09/504,808

(22) Filed: Feb. 16, 2000

(51) Int. Cl.[7] .............................................. G06F 15/00
(52) U.S. Cl. ...................................... 345/854; 345/853
(58) Field of Search .............................. 345/853, 854, 345/848, 762, 765, 744; 709/203, 210, 217, 247

(56) References Cited

U.S. PATENT DOCUMENTS

| | | |
|---|---|---|
| 4,899,394 A | 2/1990 | Lee |
| 5,699,255 A | 12/1997 | Ellis et al. |
| 5,758,110 A | 5/1998 | Boss et al. |
| 5,809,415 A | 9/1998 | Rossmann |
| 5,810,680 A | 9/1998 | Lobb et al. |
| 5,831,679 A | 11/1998 | Montgomery et al. |
| 5,838,906 A | 11/1998 | Doyle et al. |
| 5,884,014 A | 3/1999 | Huttenlocher et al. |
| 5,966,135 A | 10/1999 | Roy et al. |
| 5,978,835 A | 11/1999 | Ludwig et al. |
| 5,987,256 A | 11/1999 | Wu et al. |
| 6,011,546 A | 1/2000 | Bertram |
| 6,087,952 A | 7/2000 | Prabhakaran |
| 6,097,352 A | 8/2000 | Zavracky et al. |
| 6,185,625 B1 * | 2/2001 | Tso et al. ................... 709/247 |
| 6,195,667 B1 * | 2/2001 | Duga et al. ................. 707/513 |
| 6,298,162 B1 | 10/2001 | Sutha et al. |
| 6,313,880 B1 | 11/2001 | Smyers et al. |
| 6,317,781 B1 * | 11/2001 | De Boor et al. ............ 709/217 |
| 6,477,143 B1 | 11/2002 | Ginossar |

FOREIGN PATENT DOCUMENTS

| | | |
|---|---|---|
| EP | 0 889 402 A | 1/1999 |
| EP | 1 001 613 A | 5/2000 |
| WO | WO 97 30556 A | 8/1997 |
| WO | WO 97 38389 A | 10/1997 |
| WO | WO 9840842 A | 9/1998 |
| WO | WO 98 43177 A | 10/1998 |
| WO | WO 99 09658 A | 2/1999 |
| WO | WO 01 09836 A | 2/2001 |

OTHER PUBLICATIONS

Selected pages from AT&T Wireless, Bell Atlantic Mobile, and Nextel, as delivered through the Wayback Machine, web.archieve.org.

(List continued on next page.)

*Primary Examiner*—Cao (Kevin) Nguyen
(74) *Attorney, Agent, or Firm*—Blakely, Sokoloff, Taylor & Zafman LLP

(57) ABSTRACT

The invention discloses a portable device that allows the user to access the Internet and World Wide Web. The portable device includes a modem that connects to a cellular telephone, thus the portable device connects wirelessly to the Internet. A host computer that may also be a Web server, is connected to the Internet and comprises various software programs to translate and compress into bit map or raster images the information received from the Internet. The compressed image is sent the portable device and the device is capable of decompressing the compressed image. Thus, the user views a bit map image of a Web page. The portable device further comprises methods of pointing and clicking on text and images which represent links to other pages. All commands that the user enters into the portable device are sent to the host computer, which performs the commands via a virtual browser, and sends the information back to the portable device.

27 Claims, 3 Drawing Sheets

OTHER PUBLICATIONS

Lewis, Ted. "Information Appliances: Gadget Netopia" *Computer*, vol. 31, issue 1, Jan. 1998, pp. 59–68.

Cimini, Leonard J., Jr., et al. "Advanced Cellular Internet Service (ACIS)", *IEEE communication Magazine*, vol. 36, Issue 10, Oct. 1998, pp. 150–159.

Oliphant, Malcolm W. "The Mobile Phone Meets the Internet", *IEEE Spectrum*, vol. 36, Issue 8, Aug. 1999, pp. 20–28.

Lind, R., et al. "The Network Vehicle—A Glimpse into the Future of Mobile Multi–Media", *IEEE ASE Systems Magazine*, Sep. 1999, pp. 27–32.

Gbaguidi, Constant, et al. "A programmable Architecture for the Provision of Hybrid Services", *IEEE communications Magazine*, vol. 27, Issue 7, Jul. 1999, pp. 110–116.

Narayanaswamy, Shankar, et al. "User Interface for a PCS Smart Phone", *IEEE Int.. Conference on Multimedia Computing and Systems*, vol. 1 Jun. 1999, pp. 777–781.

International Search Report, PCT/US 01/03382, 1 pages, 2001.

International Search Report, PCT/CA 01/00114, 3 pages, 2001.

International Search Report, PCT/CA 01/00126, 3 pages, 2001.

International Search Report, PCT/CA 01/00170, 4 pages, 2002.

International Search Report, PCT/CA 01/00169, 3 pages, 2002.

International Search Report, PCT/CA 02/00048, 5 pages, 2003.

Tagawa Norio, "Data Relay System and Data Repeater Applied to the System", Patent Abstracts of Japan, vol. 1997, No. 10, Jun. 24, 1997.

Armando Fox et al, "Experience with Top Gun Wingman: a proxy–based graphical web browser fro the 3 Com PalmPilot", *Middlewave*, IFIP International Conference on Distributed Systems, Platforms and Open Distributed Processing, Sep. 1998, pp. 407–424.

Richard Han, et al., "Dynamic Adaptation in an Image Transcoding Proxy for Mobile Web Browsing", *IEEE Personal Communication*, Dec., 1998, pp. 8–17.

Timothy Bickmore, et al., "Web Page Filtering and Re–Authoring for Mobile Users", *The Computer Journal*, vol. 42, No. 6, 1999.

* cited by examiner

PORTABLE HIGH SPEED INTERNET DEVICE AND INFORMATION ON LINKS TO WEB SITES

PRIOR ART

The background of the present invention includes U.S. Pat. No. 5,925,103, Internet Access Device, which describes an improved Internet access system, vastly different from the present invention. Other prior art would include palm top computers and hand-held computers that have limited processing power due to design restrictions. Thus, these computers are much slower for accessing the Internet and World Wide Web.

The present invention enhances the server's processing speed, data transfer and retrieval to and from the portable devices, with the aid of specialized embedded software in the server. The result is a cost effective Internet access solution.

SUMMARY

It is an object of the present invention to disclose a portable device that can access the Internet and World Wide Web, at extremely low costs. It is another object of the present invention to provide fast access to the Internet such that refreshing pages is quick and efficient.

The principal embodiment of the present invention discloses a portable device that comprises a modem that connects to a cellular telephone. Thus, the device has a wireless connection to the Internet. A host computer, which may also be a Web server connects directly to the Internet. The host computer comprises multiple software programs, for example a Browser Translator, which translates HTML images into black and white bit map or raster images. The compressed bit map or raster images are sent to the portable device, and the device decompresses the images. Thus, the user views a bit map image of a Web page.

The portable device comprises methods for pointing and clicking on text and images representing links to other Web pages. Clicking events are sent to the host computer that performs the commands via a virtual browser. The host computer then sends the required information to the portable device as a compressed image. The portable device decompresses the image and the user views a new page.

In a further embodiment, the server may also send a message to the device containing information pertaining to locations of links. Icons, graphics, or text that are already in bold, and which represent links to other Web sites must be conveyed to the user but it is difficult to represent such items in bold on the device. Thus, the server may transmit a message to the device containing the specification of all the areas that would constitute a link on the page so that the palm top device would know where a link exists. Therefore, when a user passes the cursor over that area the cursor changes from an arrow to a hand. The user recognizes that the icon is a link and may therefore click upon it.

DETAILED DESCRIPTION OF THE DRAWINGS

DETAILED DESCRIPTION OF THE PRESENT INVENTION

The principal embodiment of the present invention aims to provide a device that allows a user to access the Internet or the World Wide Web (WWW, which device is similar to a palm top computer. It is a further aim of the present invention, to reduce the cost of the device. It is a further aim of the present invention, is to increase the speed of refreshing the screen when the user clicks on a link and commands another page to be displayed.

Currently, existing palm top devices such as the Palm Pilot VII and Windows CE type devices contain an operating system, and within the operating system a mini-browser to interpret information received from the WWW or Internet and then display this information on the screen. This requires a powerful microprocessor.

Figure 1:
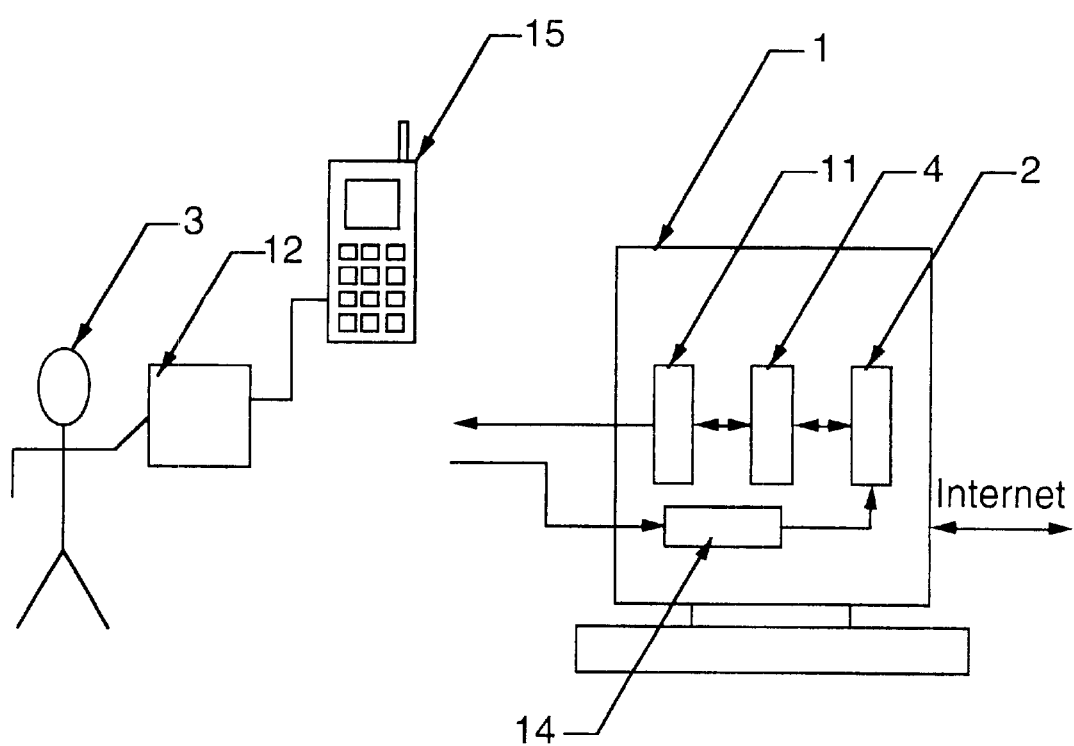
FIG. 1 illustrates block diagram of the host computer, the portable device with wireless connection and the user.
Figure 2:
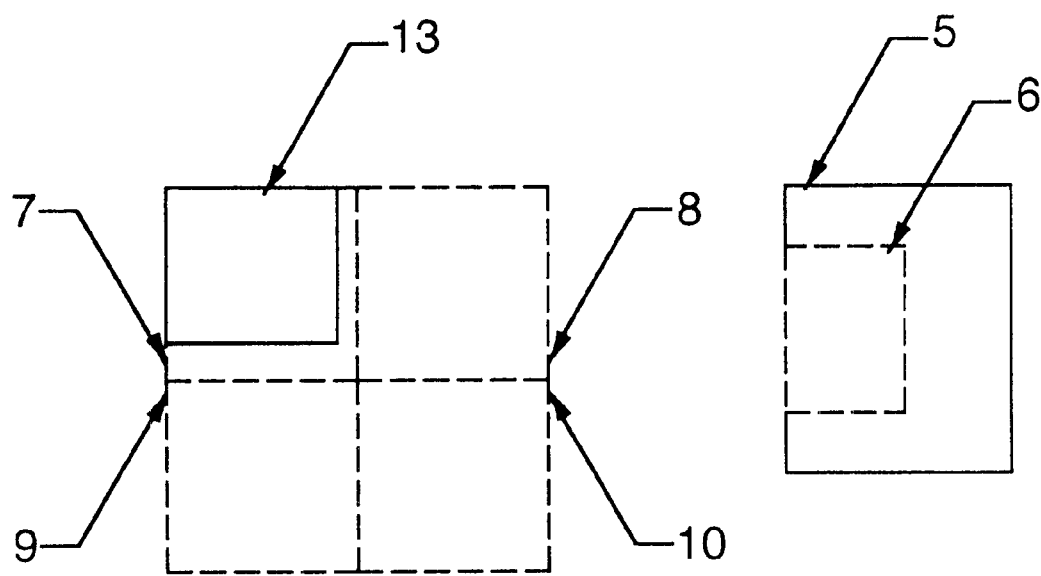
FIG. 2 illustrates portions of the image with respect to the displayable area.

The principal embodiment of the present invention is disclosed in FIG. 1. A host computer 1 is depicted that is connected to the Internet and may also be a Web server. Running in the host computer, is a Web server program 2. When a remote user 3 requests to view a Web page (or electronic message etc.) the Web server software receives HTML, JAVA, etc. information and transmits this information to another software, the Browser Translator 4. This software translates the information, (i.e. the entire image comprising graphics and text) received in the form of HTML, Java, etc. (information may be gathered from different sources) and translates it to a black and white bit map or raster image. In another embodiment, the software translates the information into a raster or color image. The image 5, as shown in FIG. 2, contains the information that would normally be displayed on a single Web page. The translation program therefore, also acts as a virtual browser 6. As can be seen in FIG. 2, the image 5 to be displayed in a browser window 6 is usually larger than the displayable area of the browser window 6.

Figure 3:
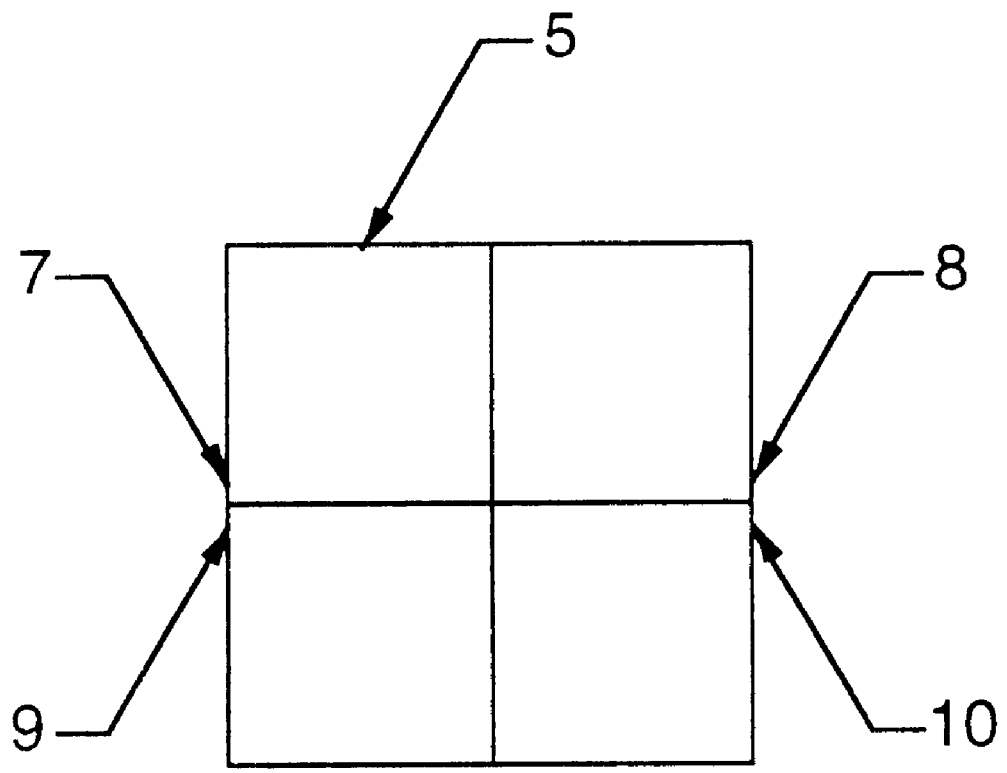
FIG. 3 illustrates sub-divisions of the image to be displayed.

The image 5 is further divided into sections 7, 8, 9, and 10, as shown in FIG. 3. The image is divided after the bitmap or raster is created. The reason for the division (as will be explained later) is for the purpose of display priority on the user's display. The image 5 is then sent to another program 11 running on the host computer 1 (FIG. 1), which compresses the image using a loss-less compression method. The compression method may be group 3 or group 4, or another method.

The programs 4 and 11 can have multiple instances running simultaneously on the host server for the purpose of connecting to multiple users. The compressed image, after being processed by program 11, is sent to the user, using a protocol in which information may be broken down into packets.

The information is received by a palm top device 12 that has the ability to display a monochrome image, in its display window 13. The information is decompressed and displayed in the order of priority such that part of image 7, which substantially or completely covers the displayable area 13 (FIG. 2), of the palm device is decompressed and displayed first and then sequentially the portions 8, 9, 10 of the image are decompressed and stored in an internal memory of the palm top device to be displayed later when the user scrolls up, down, or sideways to these parts of the image.

A CPU resident in the palm top device therefore has the ability to decompress a bit map or raster image that may be larger than the size of the display and allow the user to traverse this bit map or raster image. The primary method of traversing the image is through conventional scroll bars positioned at the sides of the image.

The resident CPU on the palm top device has no ability to determine which parts part or parts of the image, that is being displayed, represent links to other Web pages etc.

Thus, the translator program 4 (FIG. 1) translates the image in the virtual browser 6 such that the words that represent links on the page 5 (FIG. 2) are translated to be slightly bolder. The user may therefore consider text that is bold to be links.

The palm top device provides the user with a pointing device. This pointing device may be a touch screen or tracking ball, etc. The palm top device also allows the user to click on specified areas. As soon as the user clicks on part of an image, the shape of the pointer changes from an arrow to an hourglass. A message is sent to the host computer, transmitting the location of the clicked down event. A program 14 interprets the message and provides a virtual click down in the virtual browser created in the translator program 4. If the user has pressed in an area of the image that does not represent a link or text box, a message is dispatched to the palm top device which immediately changes the hourglass shape of the pointer back to an arrow (in the case of a touch screen, from an hour glass to nothing). Further to this, if the user has clicked on a part of the image which represents a link, a new Web page is extracted from the Internet or WWW, translated by translator program 4 (FIG. 1) into a bit map or raster, and compressed by compression program 11 and dispatched to the palm top device where a new page is displayed. In a further embodiment, the image 5 may be continuously updated and translated and sent to the palm top device where it is continuously being refreshed. This occurs once every few seconds. In the principle embodiment therefore, the server only responds, i.e. it only refreshes the screen when the user clicks on a link or on a text box.

In a further embodiment, the server may also send a message to the device containing information pertaining to locations of links. For example, icons, graphics, or text that is already in bold, representing links to other Web sites must be conveyed to the user but it is difficult to represent such items in bold on the device. Thus, the server may transmit a message to the device containing the specification of all the areas that would constitute a link on the page so that the palm top device would know where a link exists. Therefore, when a user passes the cursor over that area the cursor changes from an arrow to a hand. The user recognizes that the icon is a link and may therefore click upon it. The cursor changes to an hourglass and a message is sent to the server transmitting the location of the clicked down event. A program 14 interprets the message and provides a virtual click down in the virtual browser created in the translator program 4. A new Web page is extracted from the Internet or WWW, translated by translator program 4 (FIG. 1) into a bit map or raster, and compressed by compression program 11 and dispatched to the palm top device where a new page is displayed.

When the user clicks in a text box or in a box in the display area into which letters or numbers must be input, the cursor first changes into an hourglass, and a message is sent to the host server. The host server recognizes that the click down event has occurred in the text box, and sends a message back to the palm top device to inform the palm top device to pop-up a keyboard on part of the screen. The user then types, using the pointer, the letters or words to be entered into the text box and presses "enter" or "go". The keyboard then disappears and the cursor changes back to an hourglass shape (in another embodiment, the keyboard could be replaced with a real keyboard or with an area that recognizes users' handwriting). The information typed into the text box is transmitted in a message to the host computer. The host computer enters the information into a text box in the virtual browser.

The user sees, after a short pause, as the image is refreshed on the palm top device, that the words, or letters or numbers have been entered into the text box. Further to this, the host computer may also break up the image such that the portion that has been changed, i.e. the text box area, is sent first.

In another embodiment of the present invention, images are only refreshed when as event occurs such as a mouse down event on a link or in a text box.

In a further embodiment only those portions of the image that changes may be transmitted from the host computer to the palm top device. Other images in the virtual browser that are continuously changing, such as banner advertisements, may be the only other images sent to the palm top computer as they change.

In a further embodiment, the server may also send a message to the palm top device, together with the raster black and white image and the message containing the link areas, a message containing the location and area of the text boxes. In this case when the user clicks in a text box, the device realizes that the user intends to input text and provides him with a keyboard on the screen (or other means disclosed earlier). After the user enters the text, the message is sent to the server in the normal fashion described earlier.

In the principal embodiment, the palm top device also contains a modem, which can be linked to the user's mobile telephone 15 and information that is communicated between the palm top device and the host computer is sent and received wirelessly through the mobile telephone.

Furthermore, the palm top device only contains enough memory to store the current displayable page. When the user presses a back or forward button, a message is sent to the host server, and the host server sends the reference page. The back and forward buttons etc. may be hard wired into the palm top device, or may be part of the display area.

Further to this, part of the image representing buttons (and other things) on the virtual browser may be sent as part of the compressed image and buttons such as forward and back may be treated the same way as links are handled as previously described. In the principle embodiment therefore the back and forward buttons are hard coded as part of the device.

In another embodiment, the palm top device comprises a modem that permits the device to connect to a cellular telephone 15 in digital format.

In another embodiment, the connection to the cellular telephone 15 is made through an analog modem connected to an ear jack of the cellular telephone.

In yet another embodiment of the present invention, the modem is replaced by an analog modem that has the capability to be connected to a landline providing a standard 56 kbps-type connection.

Further embodiments may provide connections through ISDN, cable modems etc.

In a further embodiment, the palm top device may contain a large screen to be used in a fashion similar to a home Internet appliance.

In a further embodiment, the image transferred between the host computer and the remote device (previously the palm top device) may be a color image and the compression method used may be of a Jpeg or other compression methods used for color images. A gray scale image may also be used to reduce bandwidth or display costs.

In a further embodiment, the device includes no screen, but only outputs to be hooked to a television screen or external monitor for display.

The remote device in the principal embodiment only has the ability to decompress the image it receives; display the image it receives; allow the user to scroll through the image; provide the user with a pointing device to point and click on the image; send messages providing location of click down event; provide the user with a method to input letters and numbers; send a message containing these letters and numbers.

The principal embodiment contains no other structured or intelligent information about the image.

What is claimed:

1. A method to display a document, the method comprising:

sending a request for a remote document from a device to a remote server, the remote document having first displayable information in a non-image receiving at the device a first compressed section of an image from the remote server, the image being rendered from the entire remote document in response to the request, a portion of the image being rendered from the first displayable information;

decompressing the first compressed section to generate a first decompressed section of the image;

displaying at least a portion of the first decompressed section at a location of a display area of the device; and automatically receiving at the device a second compressed section of the image from the remote server, the second compressed section corresponding to a second section of the image, the second section of the image being outside the display area of the device when the portion of the first decompressed section is displayed at the location of the display area of the device.

2. A method as in claim 1 wherein the first displayable information comprises at least one of:

a) text;
b) text box;
c) Java; and
d) HTML.

3. A method as in claim 1 wherein the device decompresses compressed sections of the images according to a display priority.

4. A method as in claim 1 further comprising:

receiving location information from the remote server, the location information specifying in the image at least one location at which a user input can be accepted for an operation at the remote server with respect to the remote document; and communicating the location information to a user of the device.

5. A method as in claim 4 wherein the at least one location comprises a location of one of:

a) a link to a document; and
b) a text box.

6. A method as in claim 8 wherein said communicating comprises:

determining whether or not a cursor is displayed on the device at a location on the image at which a user input can be accepted for an operation at the remote server with respect to the remote document; and displaying a feedback in response to a determination that the cursor is displayed on the device at a location on the image at which a user input can be accepted for an operation at the remote server with respect to the remote document.

7. A method as in claim 6 wherein said displaying the feedback comprises:

changing a shape of the cursor.

8. A method as in claim 1 further comprising:

scrolling at exclusive control of the device to display the image.

9. A method as in claim 1 wherein the image is black and white, reduced from the remote document.

10. A machine readable medium containing executable computer program instructions which when executed by a data processing system cause said system to perform a method to display a document, the method comprising:

sending a request for a remote document from a device to a remote server, the remote document having first displayable information in a non-image format;

receiving at the device a first compressed section of an image from the remote server, the image being rendered from the entire remote document in response to the request, a portion of the image being rendered from the first displayable information;

decompressing the first compressed section to generate a first decompressed section of the image;

displaying at least a portion of the first decompressed section at a location of a display area of the device; and automatically receiving at the device a second compressed section of the image from the remote server, the second compressed section corresponding to a second section of the image, the second section of the image being outside the display area of the device when the portion of the first decompressed section is displayed at the location of the display area of the device.

11. A medium as in claim 10 wherein the first displayable information comprises at least one of:

a) text;
b) text box;
c) Java; and
d) HTML.

12. A medium as in claim 10 wherein the device decompresses compressed sections of the images according to a display priority.

13. A medium as in claim 10 wherein the method further comprises:

receiving location information from the remote server, the location information specifying in the image at least one location at which a user input can be accepted for an operation at the remote server with respect to the remote document; and communicating the location information to a user of the device.

14. A medium as in claim 13 wherein the at least one location comprises a location of one of:

a) a link to a document; and
b) a text box.

15. A medium as in claim 13 wherein said communicating comprises:

determining whether or not a cursor is displayed on the device at a location on the image at which a user input can be accepted for an operation at the remote server with respect to the remote document; and displaying a feedback in response to a determination that the cursor is displayed on the device at a location on the image at which a user input can be accepted for an operation at the remote server with respect to the remote document.

16. A medium as in claim 15 wherein said displaying the feedback comprises:

changing a shape of the cursor.

17. A medium as in claim 10 wherein the method further comprises:

scrolling at exclusive control of the device to display the image.

18. A medium as in claim 10 wherein the image is black and white, reduced from the remote document.

19. A device to display a document, the device comprising:

means for sending a request for a remote document from a device to a remote server, the remote document having first displayable information in a non-image format;

means for receiving at the device a first compressed section of an image from the remote server, the image being rendered from the entire remote document in response to the request, a portion of the image being rendered from the first displayable information;

means for decompressing the first compressed section to generate a first decompressed section of the image;

means for displaying at least a portion of the first decompressed section at a location of a display area of the device; and means for automatically receiving at the device a second compressed section of the image from the remote server, the second compressed section corresponding to a second section of the image, the second section of the image being outside the display area of the device when the portion of the first decompressed section is displayed at the location of the display area of the device.

20. A device as in claim 19 wherein the first displayable information comprises at least one of:

a) text;
b) text box;
c) Java; and
d) HTML.

21. A device as in claim 19 wherein the device decompresses compressed sections of the images according to a display priority.

22. A device as in claim 19 further comprising:

means for receiving location information from the remote server, the location information specifying in the image at least one location at which a user input can be accepted for an operation at the remote server with respect to the remote document; and means for communicating the location information to a user of the device.

23. A device as in claim 22 wherein the at least one location comprises a location of one of:

a) a link to a document; and
b) a text box.

24. A device as in claim 22 wherein said means for communicating comprises:

means for determining whether or not a cursor is displayed on the device at a location on the image at which a user input can be accepted for an operation at the remote server with respect to the remote document; and means for displaying a feedback in response to a determination that the cursor is displayed on the device at a location on the image at which a user input can be accepted for an operation at the remote server with respect to the remote document.

25. A device as in claim 24 wherein said means for displaying the feedback comprises:

means for changing a shape of the cursor.

26. A device as in claim 19 further comprising:

means for scrolling at exclusive control of the device to display the image.

27. A device as in claim 19 wherein the image is black and white, reduced from the remote document.

* * * * *